Aug. 27, 1935.   M. IRELAND   2,012,788
HEATING ELEMENT
Filed Sept. 28, 1933   2 Sheets-Sheet 1

INVENTOR
MURRAY IRELAND
By Paul, Paul Moore
ATTORNEYS

Aug. 27, 1935.   M. IRELAND   2,012,788
HEATING ELEMENT
Filed Sept. 28, 1933   2 Sheets-Sheet 2

INVENTOR
MURRAY IRELAND
ATTORNEYS

Patented Aug. 27, 1935

2,012,788

UNITED STATES PATENT OFFICE 2,012,788

HEATING ELEMENT

Murray Ireland, Minneapolis, Minn., assignor, by mesne assignments, to McGraw Electric Company, Chicago, Ill., a corporation of Delaware Application September 28, 1933, Serial No. 691,335

11 Claims. (Cl. 219—19)

This invention relates to new and useful improvements in heating elements, and more particularly to such heating elements of character commonly used in some types of domestic and commercial toasters.

Toasters used for commercial purposes are often operated for several hours a day substantially without interruption, which naturally subjects the heating elements thereof to rather hard usage, which occasionally results in one or more of said heating elements burning out, and thus temporarily rendering the toaster inoperative. When an element thus burns out, a new one is usually substituted for the damaged one, whereby the toaster may again be rendered operative.

Heating elements of the general type herein disclosed, usually comprise a thin plate or body of insulating and heat-resisting material, upon one side of which is mounted a suitable resistance wire. Two such heating elements are usually employed in each oven or toasting compartment of a toaster, and, in effect, define the side walls of the oven. Because of the resistance wire of each element being mounted upon one side face thereof, these elements must be inserted into the oven in a predetermined manner, so that the sides thereof upon which the resistance wires are mounted, will be positioned in a definite relation to the oven. In other words, they must be so positioned that the resistance wires will be facing inwardly towards the center of the oven so that food articles inserted into the oven will be exposed to the radiant heat from said resistance wires.

It frequently happens when substituting a new heating element for a damaged one, that an attendant will carelessly insert the new element into the toaster oven with its resistance wire facing outwardly, or away from the oven, in which case the oven cannot function properly because said resistance wire is rendered ineffective to heat the oven, as a result of the insulating body of the element being disposed between the resistance wire and the food article in the oven. It is therefore desirable that means be provided whereby the possibility of thus wrongly inserting the elements into the oven may be eliminated, and whereby said heating elements must be inserted into the oven in a predetermined manner, so that the resistance wires thereof will always be positioned upon the inner or oven sides thereof.

One of the main objects of the present invention therefore is to provide an improved heating element for a toaster, and a supporting means therefor, which are so constructed and arranged that the heating elements cannot be secured in operative positions in the toaster oven, unless they have been correctly inserted into the oven so that their resistance wires face inwardly or, in other words, towards each other.

A further object is to provide a toaster comprising an oven having means therein for supporting a slice of bread while being toasted, a pair of heating elements being removably mounted in said oven and forming, in effect, the side walls thereof, and means at the upper portion of the toaster for removably supporting said heating elements in operative positions in said oven, whereby they are electrically connected to a source of electrical energy.

Other objects of the invention reside in the specific construction of the heating element, including the oppositely projecting arms or clips secured to the upper edge portion thereof, whereby the heating element is suspended within the toaster oven; in the specific construction of the terminal posts provided at the upper portion of the oven, which have seats or slots therein adapted to receive the terminals of said oppositely projecting arms or clips to thereby support the heating elements in the oven, and also whereby the resistance wires of said elements are electrically connected to an electric supply circuit; in the means associated with said terminal posts and said heating element arms or clips, whereby the elements must be inserted into the oven with the resistance wires thereof facing inwardly, towards the oven; and, in the construction and arrangement of the terminal posts for the heating elements, whereby the latter are supported wholly from their upper portions and whereby they may quickly and conveniently be removed from the toaster for replacement, when necessary.

Other objects of the invention will appear from the following description and accompanying drawings and will be pointed out in the annexed claims.

In the accompanying drawings, there has been disclosed a structure designed to carry out the various objects of the invention, but it is to be understood that the invention is not confined to the exact features shown as various changes may be made within the scope of the claims which follow.

In the drawings:

Figure 1 is a detail vertical sectional view of a toaster showing in full lines, a heating element supported therein in accordance with the present invention, and showing in broken lines, the heating element partially removed from the toaster;

Figures 1, 5, 6:
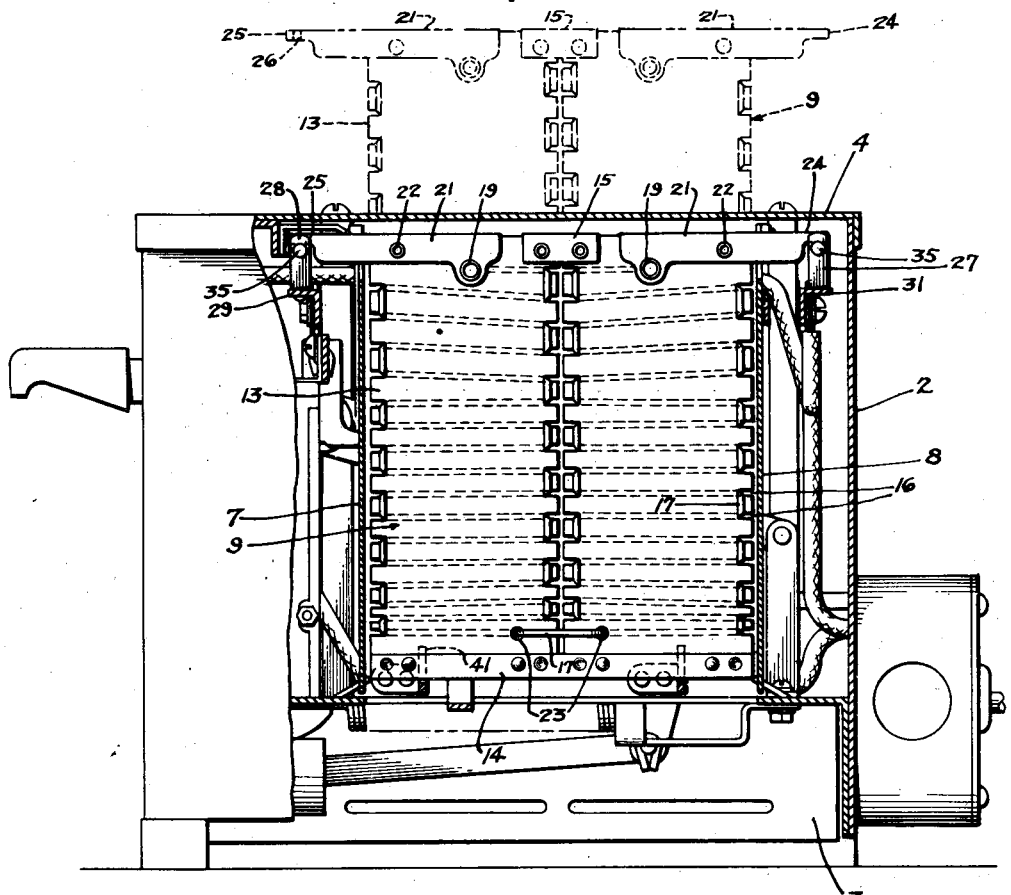
Figure 5 is an enlarged detail view in perspective, showing the connection between one of the arms of the heating element and its complemental terminal post.
Figure 6 is an enlarged detail sectional view of a terminal post such as shown in Figure 5.
Figure 2:
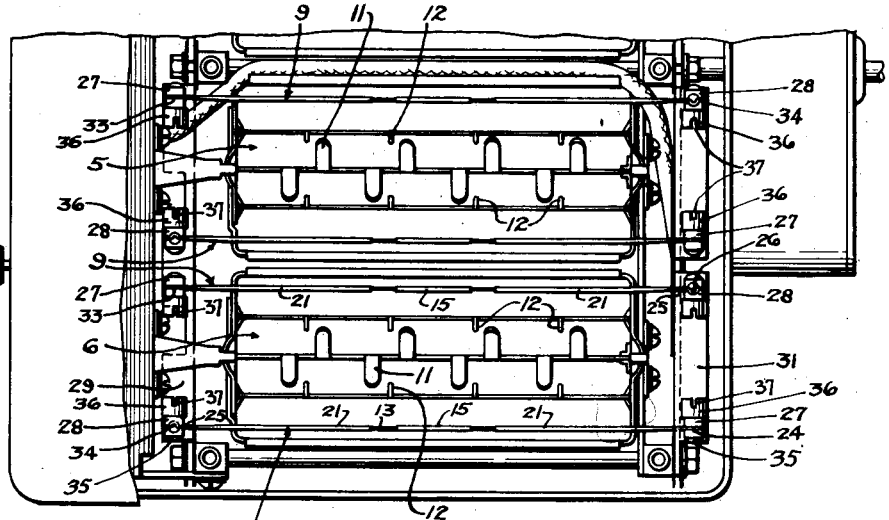
Figure 2 is a top plan view of Figure 1, partially broken away, and showing a toaster comprising two toasting compartments or ovens.

In the selected embodiment of the invention here shown, for purposes of disclosure, there is illustrated in Figures 1 and 2, a portion of a toaster comprising a casing 2 supported upon a suitable base member 3 and having a top plate 4 provided with suitable openings through which the bread slice or article to be toasted is inserted into the toasting compartments or ovens 5 and 6. The toasting compartments 5 and 6 are defined by suitable end walls 7 and 8, and pairs of heating elements, generally indicated by the numeral 9. These heating elements are removably supported in the apparatus and constitute the side walls of the toasting compartments. A suitable bread holder 11 is movably mounted in each oven and is adapted to support the bread slice while being toasted. Suitable vertical guide wires 12 are provided in each oven to prevent the bread slices from directly engaging the heating elements 9.

Figure 3:
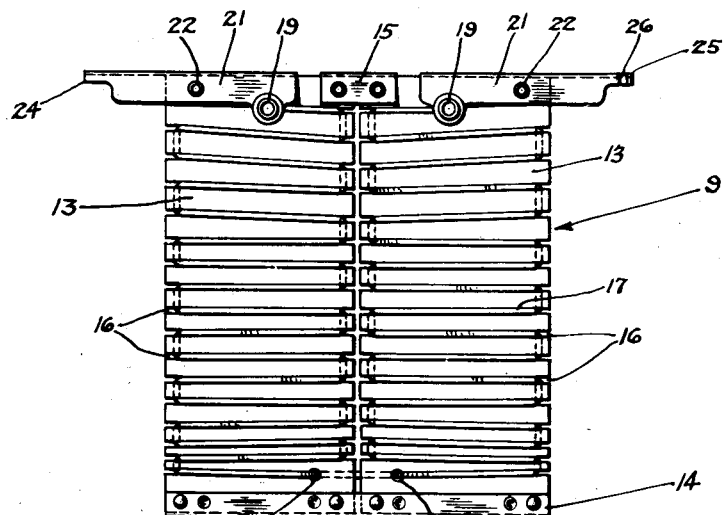
Figure 3 is a side elevational view of one of the heating elements removed from the toaster.

An important feature of this invention resides in the unique construction of the heating elements 9 and their supporting means, whereby they may readily be inserted into or removed from the toasting compartments or ovens, when necessary. One of the heating elements 9 is shown in Figure 3 as comprising a suitable flat body 13, preferably composed of two thin plates of electric insulating and heat resisting material such, for example, as mica, secured together at their lower portions by a metallic strip 14, and having their upper ends secured together by a connector 15. As all of the heating elements are alike in construction, but one need be described in detail. The vertically disposed edges of the two mica plates constituting the body 13 of the heating element 9, are serrated as shown in Figure 3, to provide a plurality of spaced lugs 16 about certain of which a suitable resistance wire or strip 17 is coiled in such a manner that the major portion of the resistance wire will be disposed on one side of the body 13 of the heating element. The ends of the resistance wire 17 are electrically secured at 19 to a pair of metallic conductor arms 21, preferably made of sheet metal and U-shaped in cross section, whereby they may be fitted over the upper edge portions of the respective mica plates constituting the body 13. The conductor arms or clips 21 are suitably secured to the mica plates by such means as rivets 22. Each mica plate is provided at its lower portion with a suitable aperture 23, through which the resistance wire 17 is threaded, as clearly shown.

Figure 4:
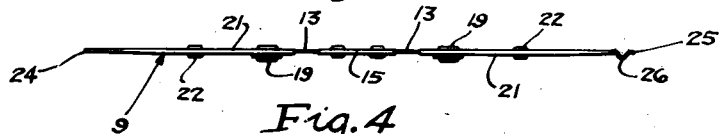
Figure 4 is a top plan view of Figure 3.

The outwardly projecting end portions of the clips or arms 21 are preferably shaped as shown in Figure 3, to provide terminals 24 and 25, the latter having an offset or arcuate portion 26, as best shown in Figures 4 and 5, for purposes which will hereinafter be disclosed.

The means for removably supporting the heating elements 9 in the ovens, comprises a plurality of terminal posts 27 and 28. These terminal posts are supported upon conductor bars 29 and 31, which are suitably secured to the frame structure of the toaster in insulated relation, each having an electrical supply wire 32 connected thereto whereby when current is applied to the toaster, the conductor bars 29 and 31 are energized.

As best shown in Figure 2, all of the terminal posts 27 are alike in construction and each comprises a transverse slot 33 adapted to receive the terminal 24 of one of the heating elements 9. Its associated terminal post 28 is, in like manner, provided with a slot 34 adapted to receive the terminal clip 25 of the heating element. Clamping screws 35 are suitably secured in the terminal posts 27 and 28 and each has a clamping nut 36 provided with a series of slots or slits 37, arranged in angular relation, and adapted to receive a suitable instrument such as a screw driver, or some other device, whereby the nuts 36 may be conveniently rotated to cause the walls of the slots 33 and 34 to clamp the terminals 24 and 25 of the heating element, and thereby secure the heating element in position in the toasting compartment, and whereby the resistance wire thereof will be electrically connected to the supply circuit of the toaster. The screws 35 and nuts 36 provide means whereby the terminal posts may be contracted so as to clampingly engage the conductor terminals 24 and 25, as will readily be understood by reference to Figures 5 and 6.

An important feature in the construction of the heating element resides in the means provided whereby the heating elements cannot be wrongly inserted into the toasting compartment or oven. By reference to Figures 1 and 3, it will be noted that the resistance wire 17 of each heating element is disposed on one side thereof, whereby said heating element must be so positioned in its respective oven that the resistance wire 17 will be facing inwardly, or, in other words, towards the center of the oven, whereby the bread slice or other article to be toasted, may be subjected to the radiant heat of the resistance wire. To prevent the heating elements from being wrongly inserted into the toaster, the terminal 25 of each element 9 is provided with an offset or arcuate portion 26 adapted to be received in a correspondingly shaped groove 38 provided in one of the walls of the slot 34, whereby it will be impossible for an attendant to wrongly insert a heating element into the toaster. The groove 38 may be formed by providing a terminal bore 39 in the upper end of each terminal post 28, as clearly shown in Figures 2 and 5.

By reference to Figure 2, it will be noted that the offset 26 provided in the terminal 25 of each heating element, is provided in one arm only, and it is also to be noted that the terminal posts 27 are not provided with grooves 38 as are the terminal posts 28. By thus constructing the terminal posts 28, and the terminals 25 of the heating elements, the latter cannot be incorrectly inserted into the toaster, thereby assuring the attendant or operator that when a new heating element is substituted for a damaged one, the resistance wire thereof will be disposed at the inner or oven side of the element, whereby its heat rays may impinge directly against the bread slice supported in the toaster oven.

As a result of only the terminal 25 of each heating element 9 being offset, as shown at 26, the heating elements must be correctly inserted into the toaster before the terminals 24 and 25 thereof may be inserted into their respective slots 33 and 34. The lower edge portions of the heating elements 9 may be received between a pair of fingers 41 which merely operate to prevent the lower end portions of said elements from swinging towards and away from the oven.

As a result of the novel construction herein disclosed, should one or more of the heating elements burn out or become damaged while in use, an attendant may quickly remove such damaged elements from the toaster and substitute new ones therefor, whereby the toaster is again rendered operative. It is to be noted that the clamping screws 35 of the terminal posts 27 and 28, are located slightly below the cover plate 4, and are readily accessible by means of a screw driver or other suitable instrument without having to dismantle the toaster. If necessary, the top plate 4 may readily be detached to gain access to the various parts of the heating elements and their supporting means. The terminals 24 and 25 of each heating element 9 are shaped as shown in Figures 4 and 5, and are supported directly upon the bodies of the clamping screws 35.

The improved heating element herein disclosed is very simple and inexpensive in construction, and by means of the offset 26 and a grooved terminal post 28, the heating elements cannot be incorrectly inserted into the oven and secured in operative position therein. This results because only one terminal post of each heating element is provided with a vertically disposed groove 38 adapted to receive the end portion 25 of an element. In the drawings, I have shown a toaster comprising two ovens or toasting compartments, but it is to be understood that the invention is equally applicable to toasters having but a single compartment, or to toasters having three or more compartments.

I claim as my invention:

1. In a toaster, an oven having means therein for supporting an article while being toasted, a heating element in said oven comprising a body portion of electric-insulating and heat resisting material, a resistor mounted on one side of said body, oppositely extending arms secured to the upper end of the body portion and electrically connected to the resistor thereon, terminal posts in the upper portion of the oven adapted to be engaged by the arms of the heating element to thereby support said element in operative position in the oven, an engaging arm and post embodying cooperating similarly shaped engaging portions differing for the respective arms on a heating element to prevent mounting a heating element in a reversed position.

2. In a toaster, an oven having means therein for supporting an article while being toasted, heating elements removably supported in said oven and defining the side walls thereof, each of said heating elements comprising an insulating and heat resisting body having a resistance wire supported on one side thereof, metallic clips secured to the upper portion of each of said bodies in insulated relation and extending outwardly beyond the edges thereof, said clips being electrically connected to the resistance wires of their respective elements, a pair of terminal posts for each heating element mounted in the upper portion of the toaster, said terminal posts having vertically disposed slots therein adapted to receive said clips to thereby provide supports for the heating elements, and also whereby the resistance wires thereof are electrically connected to said terminal posts, and means on said clips adapted to interlock with means in said slots to prevent accidental reversal of said elements.

3. In a toaster, an oven having means therein for supporting an article while being toasted, heating elements removably supported in said oven and each comprising an insulating and heat resisting body having a resistance wire supported on one side thereof, metallic clips having end portions of different shapes secured to the upper portion of each of said bodies in insulated relation and extending outwardly beyond the side edges thereof, said clips being electrically connected to the resistance wires of their resepctive elements, a pair of terminal posts for each heating element mounted in the upper portion of the toaster, said terminal posts having vertically disposed slots therein of different shapes similar to those of the end portions of the respective clips adapted to receive the terminals of said clips to thereby provide supports for the heating elements and to prevent location of the heating element in a reversed position in the oven.

4. In a toaster, an oven having means therein for supporting an article while being toasted, heating elements removably supported in the oven and each comprising an insulating body, a resistance wire on each insulating body, a pair of clips secured to the upper portion of each of said bodies and extending outwardly beyond the side edges thereof, said clips being connected to said resistance wires, means at the upper portion of the oven adapted to receive said clips to thereby removably support the heating elements, said clip receiving means and the clip received therein at the two side edges of a heating element being dissimilar and non-interengageable to ensure location of the heating elements in the oven in definite relation to the article supporting means.

5. In a toaster, an oven having means therein for supporting an article while being toasted, heating elements removably supported in the oven and each comprising an insulating body, a resistance wire on each insulating body, a pair of clips secured to the upper portion of each of said bodies and extending outwardly beyond the side edges thereof, said clips being connected to said resistance wires, an electric circuit, slotted terminal posts at the upper portion of the oven adapted to receive said arms to thereby removably support the heating elements, and whereby the resistance wires are electrically connected to the circuit, and one clip of each element having an off-set portion adapted to interlock with means in one of said terminal posts to prevent accidental reversal of the elements in said posts.

6. In a toaster, an oven having means therein for supporting an article while being toasted, heating elements removably supported in said oven, resistance wires on said elements, conductor clips secured to the upper portions of said heating elements and extending beyond the edges thereof, said clips being electrically connected to said resistance wires, terminal posts at the upper portion of the oven having slots therein adapted to receive the terminals of said clips to thereby support the heating elements, a wall of the slot of one of the terminal posts of each pair having a vertical groove therein, and one of the clips of each element having an offset portion adapted to be received in said vertical grooves, whereby the heating elements must be inserted into the oven in a definite relation with respect to the oven.

7. In a toaster, an oven having means therein for supporting an article while being toasted, heating elements in the oven, resistance wires on said elements, conductor clips secured to the upper portions of said heating elements and extending beyond the side edges thereof and connected to said resistance wires, a pair of terminal posts removably supporting each element, said terminal posts having transverse slots therein adapted to receive said clips, screw elements engageable with said slotted terminal posts whereby they may be actuated to clampingly grip the clips of the heating elements supported in said slots, and interlocking means for preventing accidental reversal of the elements in their respective posts.

8. In a toaster, an oven having means therein for supporting an article while being toasted, heating elements in the oven, resistance wires on said elements, conductor clips secured to the upper portions of said heating elements and extending beyond the side edges thereof and connected to said resistance wires, a pair of terminal posts removably supporting each element, said terminal posts having transverse slots therein adapted to receive said clips, screw elements engageable with said slotted terminal posts whereby they may be actuated to clampingly grip the clips of the heating elements supported in said slots, and one terminal post of each pair of said posts having a vertical groove therein adapted to receive an offset portion on one of the clips of each element, whereby said elements cannot be accidentally reversed when inserted into the oven.

9. In a device of the class described, a support including a pair of upright terminal posts having vertically disposed slots therein, a heating element comprising a body portion of insulating and heat-resisting material, a resistance wire mounted on one side of said body portion, clips secured to the upper portion of said body and outwardly extending beyond the side edges thereof, said clips having terminals adapted to be received in the slots in said terminal posts, clamping elements mounted in said posts and whereby the latter may be contracted to clampingly engage said clips to thereby secure the heating element in operative poistion, and means on one of said clips adapted for interlocking engagement with means on one of said terminal posts to thereby prevent accidental reversal of the heating element.

10. In a device of the class described, a support including spaced terminal posts, each having a vertical slot therein differing in horizontal sectional shape from each other, studs mounted in said terminal posts and traversing said slots, and whereby the walls of said slots may be contracted, a heating element including outwardly extending arms having end portions of different shapes in horizontal section adapted to be received in one position only in said slots and supported on said studs, said arms being secured to said posts by rotation of said studs, whereby the walls of the slots clampingly engage said arms.

11. An electrical heating device, comprising in combination, a pair of horizontally spaced terminal posts, a vertical slot in one post having a straight wall, a vertical slot in the second post having straight and curved wall portions, a heating element having outwardly extending electrically-conducting arms adapted to engage the respective terminal posts, one arm having a straight end portion and the second arm having a straight and curved end portion to prevent mounting the heating element in a reversed position on said terminal posts.

MURRAY IRELAND.